(12) United States Patent
Holstad

(10) Patent No.: US 8,333,219 B2
(45) Date of Patent: Dec. 18, 2012

(54) PLUG FOR SETTING IN A PIPE

(76) Inventor: Evald Holstad, Sola (NO)

( * ) Notice: Subject to any disclaimer, the term of this patent is extended or adjusted under 35 U.S.C. 154(b) by 16 days.

(21) Appl. No.: 13/145,221

(22) PCT Filed: Jan. 20, 2010

(86) PCT No.: PCT/NO2010/000022
§ 371 (c)(1),
(2), (4) Date: Jul. 19, 2011

(87) PCT Pub. No.: WO2010/085154
PCT Pub. Date: Jul. 29, 2010

(65) Prior Publication Data
US 2011/0278022 A1  Nov. 17, 2011

(30) Foreign Application Priority Data
Jan. 21, 2009 (NO) .................................. 20090323

(51) Int. Cl.
*F16L 55/10* (2006.01)
(52) U.S. Cl. ............. 138/90; 138/89; 220/235; 220/237
(58) Field of Classification Search ............ 138/89, 138/90, 93; 220/235, 237; 405/169, 171
See application file for complete search history.

(56) References Cited

U.S. PATENT DOCUMENTS

| | | | |
|---|---|---|---|
| 2,154,498 A | 5/1938 | Eagar | |
| 2,399,766 A | 5/1946 | Wendell | |
| 2,870,794 A * | 1/1959 | Thaxton | 138/90 |
| 2,974,685 A * | 3/1961 | Ver Nooy | 138/90 |
| 3,323,551 A * | 6/1967 | Bell et al. | 138/90 |
| 3,568,721 A * | 3/1971 | Ross et al. | 138/97 |
| 4,282,982 A * | 8/1981 | Nuesslein | 220/237 |
| 4,381,800 A * | 5/1983 | Leslie | 138/90 |
| 4,436,117 A * | 3/1984 | Martin | 138/89 |
| 4,474,216 A * | 10/1984 | Noe | 138/89 |

(Continued)

FOREIGN PATENT DOCUMENTS
EP  0506013 A2  3/1992
(Continued)

OTHER PUBLICATIONS

Vigdis WI Project Pipe End Plug, Operation Procedure Project No. IK-15739-DOC-02 dated May 30, 2008, pp. 1-7.

*Primary Examiner* — Patrick F Brinson
(74) *Attorney, Agent, or Firm* — Gable Gotwals

(57) ABSTRACT

A pipe plug comprising a shaft, a force transmission body disposed in a rotatable and axially movable manner about the shaft via a thread connection, and a stop body. Between the force transmission body and the stop body there is a first compression body disposed in an axially movable manner about the shaft in proximity of the force transmission body; a conical support body disposed in an axially movable manner about the shaft; at least one movable anchoring body on the outside of the support body; a second compression body disposed in an axially movable manner about the shaft; and at least one elastic sealing body disposed about the shaft. The shaft and the first compression body are in direct contact with each other and are connected in a non-rotational manner via complementary connection elements to prevent the compression body from rotating.

20 Claims, 5 Drawing Sheets

U.S. PATENT DOCUMENTS

| | | | | |
|---|---|---|---|---|
| 4,760,868 A * | 8/1988 | Saxon | | 138/89 |
| 4,982,764 A * | 1/1991 | Saxon | | 138/89 |
| 5,560,394 A * | 10/1996 | Jorgensen | | 138/89 |
| 6,367,313 B1 | 4/2002 | Lubyk | | |
| 7,568,504 B2 | 8/2009 | Syse | | |
| 7,766,046 B2 * | 8/2010 | Syse et al. | | 138/89 |
| 7,878,221 B2 * | 2/2011 | Aleksandersen et al. | | 138/98 |
| 7,909,065 B2 * | 3/2011 | Aleksandersen et al. | | 138/89 |
| 8,171,960 B2 * | 5/2012 | Syse et al. | | 138/89 |
| 2004/0074549 A1 | 4/2004 | Allen | | |
| 2005/0241710 A1 * | 11/2005 | Early et al. | | 138/89 |
| 2010/0051130 A1 * | 3/2010 | Syse et al. | | 138/89 |

FOREIGN PATENT DOCUMENTS

| | | |
|---|---|---|
| GB | 2081838 A | 2/1982 |
| GB | 2204378 A | 2/1988 |
| NO | 324712 | 3/2007 |

* cited by examiner

PLUG FOR SETTING IN A PIPE

CROSS-REFERENCE TO RELATED APPLICATIONS

This application is the United States National Phase of PCT Patent Application No. NO/2010/000022 filed on 20 Jan. 2010, which was published in English on 29 Jul. 2010 under Publication No. WO 2010/085154 A9, which claims priority to Norwegian Patent Application No. 20090323 filed 21 Jan. 2009, both of which are incorporated herein by reference.

FIELD OF INVENTION

The present invention concerns a plug for setting in a pipe, for example a well pipe, a pipe in a processing plant or similar, or a singular pipe.

The present plug may, for example, be used as a sealing plug in a pipe to be pressure tested, or for pressure testing of a welded joint in the pipe.

The plug may also be used as a temporary or permanent pressure barrier in a pipe, for example a well pipe or a pipe in a processing plant or similar, carrying a pressurized fluid, including hydrocarbons, water and/or other fluids.

Further, the plug may be used as an anchoring means for tools and/or components to be fixed with controlled force in a pipe, for example downhole tools to be fixed in a well pipe.

Yet further, the plug may be used as a diminishing pipe, a so-called "reducer", in order to reduce the cross-sectional area of a pipe, for example a pipe in a processing plant, in the plug section. When used for such an application, the plug is structured in a flow-through manner.

Thus, the present plug may be structured and used as a pressure testing plug, as a pressure barrier, as an anchor means, or as a flow-through diminishing pipe in a pipe.

BACKGROUND OF THE INVENTION

The background of the invention relates to various problems associated with known plugs for setting in pipes. Such plugs are readily used for pressure testing of pipes or weld joints therein.

The plug activation force required for setting of sealing elements and/or gripping elements for such plugs, is usually supplied by virtue of mechanical, hydraulic or pneumatic means.

A substantial problem with mechanical activation is that much of the supplied activation energy, for example a torque, is lost due to friction between movable parts in the plug. Moreover, a foothold (counteracting support) oftentimes must be taken in a suitable element in the surroundings of the plug in order to be able to supply said torque to the plug, but also to be able to prevent the plug from rotating when the torque is supplied.

Hydraulic/pneumatic activation by means of a pressurized fluid, however, is more sensitive to pressure leakages in the plug or in the transmission of pressurized fluid to the plug.

Such known plugs are associated with problems both in terms of operation, time, cost and safety.

PRIOR ART AND DISADVANTAGES THEREOF

As examples of prior art in the present field, the following patent publications are mentioned:
U.S. Pat. No. 4,381,800;
U.S. Pat. No. 6,367,313;
NO 324712;
EP 0.506.013; and
GB 2.204.378.

U.S. Pat. No. 4,381,800, U.S. Pat. No. 6,367,313, as well as parts of NO 324712 (cf. FIGS. 3-5), show examples of mechanically activated plugs.

Upon mechanical activation and setting of such a plug, activation energy is generally supplied in the form of a torque which, via at least one force transmission element, is converted into a resulting activation- and setting force for the sealing elements and/or gripping elements of the plug. The torque may be supplied via a nut, sleeve, bolt or similar, whereas the activation force oftentimes is transmitted via a compression plate and associated conical or wedge-shaped force transmission elements.

A common problem with such mechanical force transmission is, as mentioned, that a substantial part of the supplied activation energy (the torque) is lost as friction. The proportion of the activation energy (and thus the setting force) reaching the sealing elements and/or gripping elements of the plug may therefore be substantially smaller than the supplied activation energy. For this reason, it may be difficult to set the plug with a precise and controlled setting force in a pipe. Thereby, the plug may be set against the wall of the pipe with too large or too small of a setting force. Too large of a force may inflict damage to the pipe and/or part of the plug, whereas too small of a force may cause unsatisfactory setting of the plug and/or causing it to disengage during use. Both situations are obviously unfavourable.

EP 0.506.013, GB 2.204.378 and parts of NO 324712 (cf. FIGS. 1-2), however, show examples of fluid-activated plugs.

Upon hydraulic or pneumatic activation and setting of such a plug, activation energy in the form of a pressurized fluid is supplied to at least one actuator or similar in the plug. The actuator may, for example, be comprised of a cylinder with an accompanying piston. The movement of the piston in the cylinder is then converted to a resulting activation- and setting force for the sealing elements and/or gripping elements of the plug. Typically, the force transmission is carried out via at least one force transmission element; similar to that of the above-mentioned mechanical plug.

Also in context of such pressure activation, a part of the activation energy may be lost due to friction between movable parts in the plug. However, and as mentioned, such a plug is mostly vulnerable to pressure leakages in the plug or in the transmission of pressurized fluid. The reason for this is that the setting force and sealing ability of the plug is related to the supplied piston force, which is directly related to the pressure in the supplied activation fluid. Lacking or insufficient fluid pressure may therefore cause the plug to disengage during use. If the plug disengages whilst being under pressure in a pipe, for example in a well pipe, this may result in the plug being forced at high speed out of the pipe, thus resembling a projectile. Naturally, this may inflict great damage to nearby equipment and personnel.

Such a pressure activated plug also requires various other equipment for allowing it to be operated, for example a power unit for pressure generation, and also valves, couplings, hoses and/or lines, etc. for transmission of pressurized fluid to the plug. Such equipment is complicated and also cost-driving for the use of the plug.

OBJECTS OF THE INVENTION

The primary object of the invention is to provide a plug which at least reduces one of said disadvantages of the known plugs.

A more specific object is to provide a mechanically activated plug capable of being set with a precise and controlled setting force in a pipe, and which does not require a foothold (counteracting support) in the surroundings of the plug in order to be set.

It is also an object to provide a relatively simple and operationally reliable plug which is easy to set and disengage, and which thus may be used repeatedly.

Further, it is an object to provide a flexible plug which may be easily adapted to different areas of application.

The object is achieved by virtue of features disclosed in the following description and in the subsequent claims.

GENERAL DESCRIPTION OF HOW THE OBJECT IS ACHIEVED

In a first aspect of the present invention, a plug for setting in a pipe is provided, the plug comprising:
- a shaft having a first end and a second end;
- a force transmission body disposed about the shaft at the first end thereof, wherein the force transmission body is connected in a rotatable and axially movable manner to the shaft via a thread connection;
- a stop body disposed at the second end of the shaft. In addition, the following elements are disposed between the force transmission body and the stop body:
- a first compression body disposed in an axially movable manner about the shaft and in proximity of the force transmission body;
- a support body with a conical surface disposed in an axially movable manner about the shaft;
- at least one anchoring body structured axially movable, hence radially movable, on the outside of the conical support body;
- a second compression body disposed in an axially movable manner about the shaft; and
- at least one elastic sealing body disposed about the shaft. The distinctive characteristic of the plug is that the shaft and the first compression body are disposed in direct contact with each other; and
    wherein the shaft and the first compression body are connected in a non-rotational manner via complementary connection elements.

This distinctive characateristic of the present plug distinguishes it from all of the above-mentioned, known plugs.

By means of this plug construction the first compression body is prevented from rotating when the force transmission body is rotated. This ensures an optimum transmission and control of an activation force for the plug.

By disposing the shaft and the first compression body in direct contact with each other, and such that they cannot be rotated relative to each other, a close and wobble-free connection is also obtained between the shaft and the first compression body. Fixation by wedging (bulldogging) of said elements is thus avoided.

Upon activation of the plug, and due to the shaft and the first compression body being connected in a non-rotational manner, friction is also avoided between said elements. by so doing, most of the supplied activation energy will reach the anchoring body and the sealing body for activation and setting thereof. This renders possible to set the plug with a precise and controlled setting force in a pipe. This also renders possible to disengage the plug in a precise and controlled manner, whereupon the plug may be used again.

Insofar as the present plug construction is structured in a manner allowing it to take a foothold (counteracting support) within itself in order to rotate the force transmission body thereof, the plug will not require a foothold in the surroundings thereof in order to be set in a pipe. Advantageously, this implies that the plug will not rotate upon activation and setting in the pipe, or upon disengagement thereof from the pipe.

Further, said first and/ord second compression body may, for example, be plate-shaped or disc-shaped, possibly as a compression ring enclosing the shaft of the plug. Other suitable shapes may also be used. The shape of the compression body, however, must be suitable for allowing an activation force to be transmitted to said support body and sealing body.

Said thread connection between the force transmission body and the shaft is also of a type and form suitable for the particular purpose, preferably threads of a self-locking type. Self-locking threads ensure that both the anchoring body and the sealing body maintain their positions once the plug is set and no activation force is supplied to the plug. This is considerably different from the mode of operation of the above-mentioned, known and hydraulically/pneumatically activated plugs, which will fail in response to any pressure leakages in the plug or in its transmission of pressurized fluid.

Further, said connection between the shaft and the first compression body may be comprised of a tongue and groove type of connection, which comprises complementary connection elements, for example a spline connection.

As an alternative to such a tongue and groove type of connection, the shaft may have a non-circular cross-sectional shape, whereas the first compression body comprises an axial opening having a complementary, non-circular cross-sectional shape relative to that of the shaft. Thus, the shaft may, for example, have an unround, possibly a polygonal or oval, cross-sectional shape capable of fitting into a complementary shaped opening in the first compression body. The interstice between the shaft and the compression body should have little deviation in tolerance and also be provided with a lubricant in order to obtain as little friction as possible and to promote sliding between these elements.

Further, said force transmission body may be comprised of a nut or a sleeve. Other force transmission bodies of suitable shape may also be used.

Furthermore, the at least one anchoring body may be comprised of a gripping jaw, gripping wedge, gripping claw, gripping dog or similar construction provided with hooks, teeth, claws or similar for engagement with an enclosing pipe wall. Such anchoring bodies are structured allowing them to be displaced on the outside of said conical support body. Advantageously, this support body may be structured with a hard and smooth surface, for example a polished surface, and/or be provided with a suitable lubricant in order to reduce friction and thereby promote the sliding of the anchoring bodies on the outside of the support body.

Further, said stop body may be comprised of a plate, disc or flange. Other stop bodies of a suitable shape may also be used.

Yet further, said elastic sealing body may be comprised of an elastomer material. Other sealing bodies of a suitable type may also be used.

In addition, said second compression body may be disposed in proximity of the support body;
    wherein an elastic delay body is disposed between the second compression body and the support body; and
    wherein the delay body is structured in a manner allowing it to be deformed more in the axial direction than that of the sealing body upon compression thereof.

The primary object of such an elastic delay body is to ensure that said anchoring body is set before the sealing body is set. Thereby the sealing body is protected against any damage during setting of the plug.

In order to ensure that the elastic delay body deforms more than that of the sealing body upon compression thereof, the delay body may be formed from a softer and more yielding material than the material of the sealing body.

As an addition or alternative, the elastic delay body may be arranged with a smaller cross-sectional area than the cross-sectional area of the sealing body. A smaller cross-sectional area of the delay body will provide for less material resistance during compression thereof.

In other respects, the elastic delay body may be comprised of an elastomer material, possibly another material of a suitable type.

As another alternative, the elastic delay body may be comprised of at least one spring, for example a coil spring.

Use of such a delay body in the plug also brings about another advantage. When the plug is set against the pipe wall and the elastic delay body is compressed, latent energy is stored the delay body. If the plug subsequently is disengaged from the pipe wall, whereby the elastic delay body expands, this inherent energy in the delay body is released. Then the released energy will contribute to disengage and displace the at least one anchoring body away from the enclosing pipe wall, which facilitates the disengagement of the plug from the pipe. This energy contribution is additional to the released energy from the very plug. The latter energy was stored in the plug during its incipient activation and setting against the pipe.

The present plug may also comprise a driving device structured for rotation of the force transmission body and simultaneous, rotation-preventing fixation of the shaft.

In one embodiment, the driving device may comprise a rotatable inner part and a stationary outer part;
  wherein the rotatable inner part is connected to the force transmission body for rotation thereof; and
  wherein the stationary outer part also comprises an internal connection body connected to the shaft for rotation-preventing fixation thereof.

In another embodiment, the driving device may comprise a rotatable inner part and a stationary outer part;
  wherein the rotatable inner part is connected to the force transmission body for rotation thereof; and
  wherein the stationary outer part, for rotation-preventing fixation of the shaft, is connected to the first compression body via an external connection body disposed about the force transmission body. This external connection body may, for example, be comprised of a sleeve or be comprised of a sleeve-shaped body formed as an axial extension of the first compression body.

Said driving device may, for example, be comprised of an electric motor, a hydraulic motor or a pneumatic motor. Such a motor will require, out of necessity, a corresponding motive power and also control signals for allowing it to activate and drive movable parts in the plug. Further, the motive power source may be located externally or internally relative to the motor. The motive power source may therefore be comprised of a power unit located at a distance from the motor and the plug, for example at surface, whereas the plug may be located in an underground well. This requires a connection between the power unit and the motor for transmission of motive power and control signals thereto. Alternatively, the motive power source, for example at least one battery, and a potential control unit for the motor may be disposed in close proximity thereof. As such, the motor may comprise an integral power unit and control unit including required electronic components and transmission means. Further, the control unit may be structured in a manner allowing it to receive remote-controlled control signals via a cabled or wireless connection.

Use of a motorized driving device for operation of the present plug is best suited when the plug is to be inserted into a long pipe, for example a well pipe, within which manual operation of the plug is difficult or impossible.

The present plug may also be operated manually and without such a driving device, but most likely in context of setting the plug in a pipe on surface.

Further, the shaft of the plug may be provided with a throughgoing and flow-through opening. This may prove useful in various circumstances, which will be explained in further detail hereinafter.

In a second aspect of the present invention, a method of setting a plug in a pipe is provided.

The distinctive characteristic of the method is that it comprises the following steps:
  using the present plug provided with a non-flow-through shaft;
  inserting the plug to a setting point in the pipe; and
  rotating the force transmission body relative to the shaft until said anchoring body and sealing body have been set against the wall of the pipe.

As mentioned above, the present plug is flexible and may easily be adapted to different areas of application.

According to a first embodiment, and in order to pressure test the pipe, the method may therefore comprise a step of pressure-isolating the pipe at a point located at a distance from said setting point of the plug. Thereby, a pipe section located between said two points is prepared for pressure testing.

According to this first embodiment, the method may also comprise the following steps:
  using a plug having a shaft provided with a throughgoing and flow-through opening; and
  directing a pressure testing medium via the opening in the shaft in order to pressure test said pipe section.

According to a second embodiment, and in order to establish a pressure barrier in the pipe, the method may also comprise a step of inserting the plug to a setting point in the pipe. Consequently, a non-flow-through shaft is therefore used in this context.

According to a third embodiment, and in order to anchor equipment in the pipe, the method may also comprise the following steps:
  connecting the equipment to the plug; and
  inserting the plug to a setting point in the pipe.

According to this third embodiment, a plug having a non-flow-through shaft, or a shaft provided with a throughgoing and flow-through opening, may be used.

According to a fourth embodiment, and in order to reduce the cross-sectional area of flow of the pipe, the method may also comprise the following steps:
  using a plug having a shaft provided with a throughgoing and flow-through opening; and
  inserting the plug to a setting point in the pipe.

In this context, the plug is used as a diminishing pipe, a so-called "reducer", in order to reduce the cross-sectional area of flow of the pipe, for example a pipe in a processing plant, in the plug section.

The pipe within which the plug is placed, may possibly be comprised of a pipe in an underground well, i.e. a well pipe. Such a well pipe may be comprised of a casing, liner, production tubing, injection tubing or similar.

Hereinafter, non-limiting and exemplary embodiments of the present plug will be shown.

SHORT DESCRIPTION OF THE FIGURES OF THE EXEMPLARY EMBODIMENTS

Figure 8:
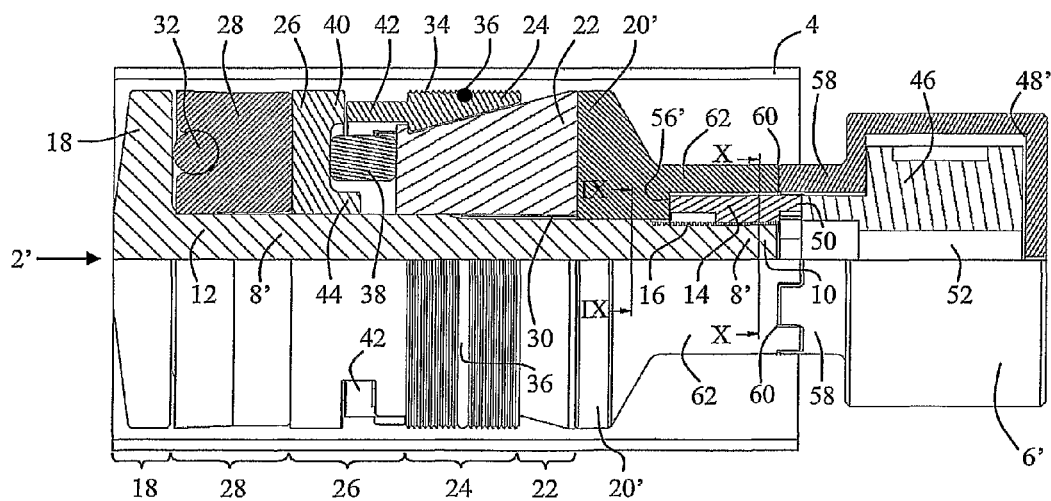
FIG. 8 shows, in partial cross-section, a front elevation of the plug according to FIG. 7, wherein the plug is shown in an inactive position in the pipe.
Figures 9, 10:
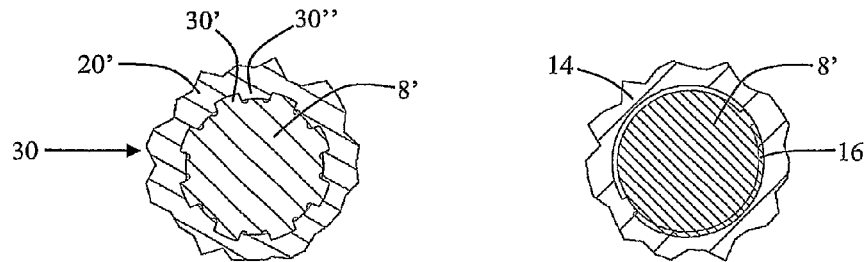
FIGS. 9 and 10 show cross-sections through the plug according to FIG. 8 taken along section lines IX-IX and X-X, respectively, of FIG. 8.
Figure 13:
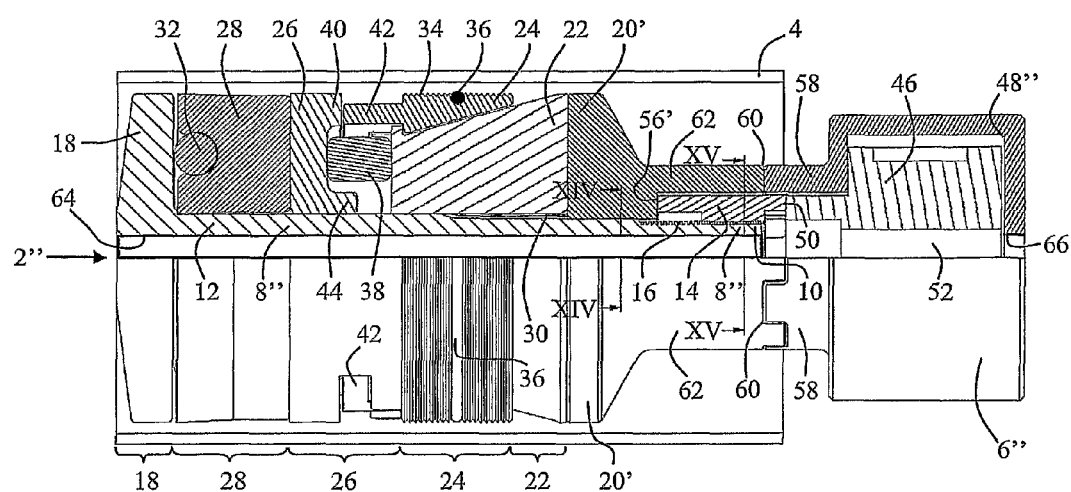
Figures 14, 15:
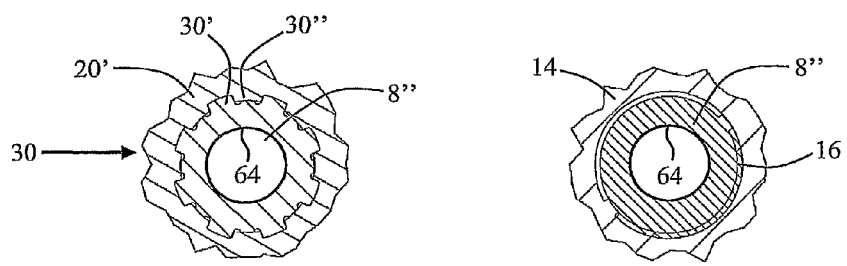

FIG. 13 shows a third embodiment of a plug according to the invention placed in a pipe, wherein the plug essentially is similar to the plug according to FIG. 8, but wherein the shaft and the motor of the plug is provided with a throughgoing and flow-through opening; and FIGS. 14 and 15 show cross-sections through the plug according to FIG. 13 taken along section lines XIV-XIV and XV-XV, respectively, of FIG. 13.

In order to facilitate the understanding of the invention, the figures are depicted somewhat simplified and show only the most essential plug construction elements of the present plug. The shapes, relative dimensions and mutual positions of the elements may also be somewhat distorted. Hereinafter, identical, equivalent or corresponding details in the figures will be given substantially the same reference numerals.

SPECIFIC DESCRIPTION OF THE EXEMPLARY EMBODIMENTS

Figure 1:
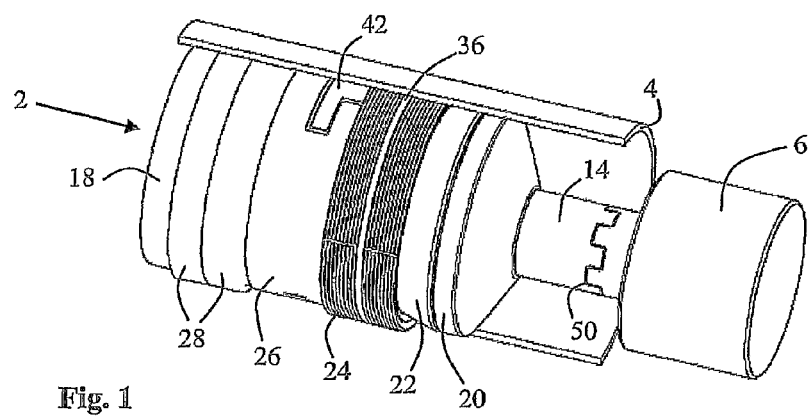
FIG. 1 shows a perspective view of a first embodiment of a plug according to the invention placed in a pipe, wherein the plug also comprises a motor for activation and setting of the plug in the pipe.

FIG. 1 shows a first embodiment of a plug 2 according to the invention placed within a pipe 4. Only a segment of the pipe 4 is shown in the figure. This also applies to the other figures showing the pipe 4.

In this embodiment, the plug 2 comprises a driving device in the form of an electric motor 6 for activation and setting of the plug 2 in the pipe 4. The motor 6, which is shown very schematically, is also connected to various other equipment (not shown) for operation thereof, including an electronic control unit and at least one line for supply of motive power and control signals to the motor 6.

Figure 2:
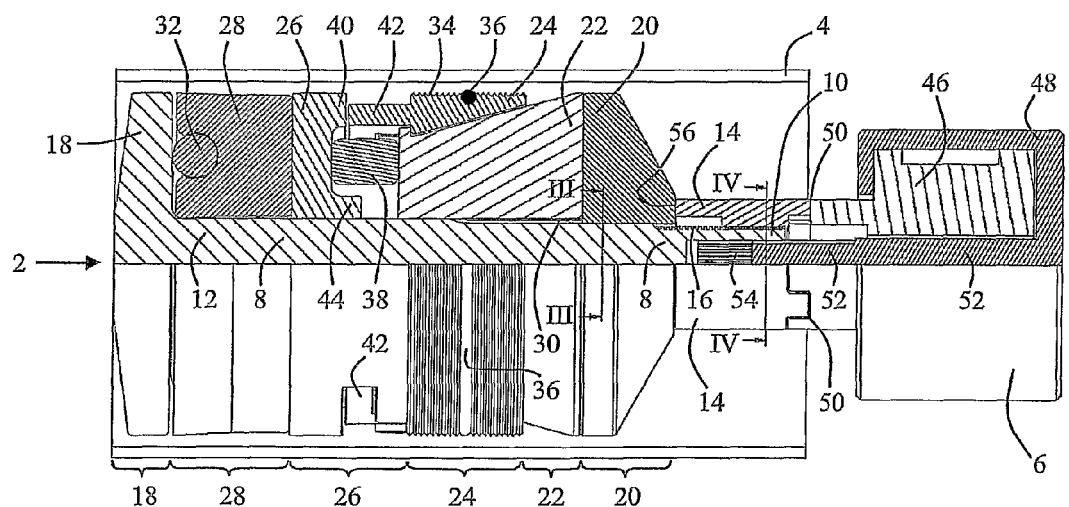
FIG. 2 shows, in partial cross-section, a front elevation of the plug according to FIG. 1, wherein the plug is shown in an inactive position in the pipe.

FIG. 2 shows a partial cross-section through an upper half of the plug 2, whereas the lower half of the figure shows the plug as seen from the outside.

The plug 2 comprises, among other things, the following plug construction elements:
a shaft 8 having a first end 10 and a second end 12;
a force transmission sleeve 14 disposed about the shaft 8 at the first end 10 thereof, wherein the force transmission sleeve 14 is connected in a rotatable and axially movable manner to the shaft 8 via a self-locking thread connection 16 (cf. FIG. 4) disposed therebetween; and
a stop plate 18 disposed at the second end 12 of the shaft 8.

Further, the following plug construction elements are disposed between the force transmission sleeve 14 and the stop plate 18:
a first compression ring 20 disposed in an axially movable manner about the shaft 8 and in contact with the force transmission sleeve 14;
a support body 22 with a conical surface disposed in an axially movable manner about the shaft 8 and in contact with the first compression ring 20;
several wedge-shaped gripping dogs 24 distributed about the conical support body 22 and structured axially movable, hence radially movable, on the outside of the support body 22, the gripping dogs 24 forming anchoring bodies for the plug 2;
a second compression ring 26 disposed in an axially movable manner about the shaft 8 and in contact with the gripping dogs 24; and
a two-part sealing body 28 of a suitable elastomer material disposed about the shaft 8 and in contact with said stop plate 18.

Figures 3, 4:
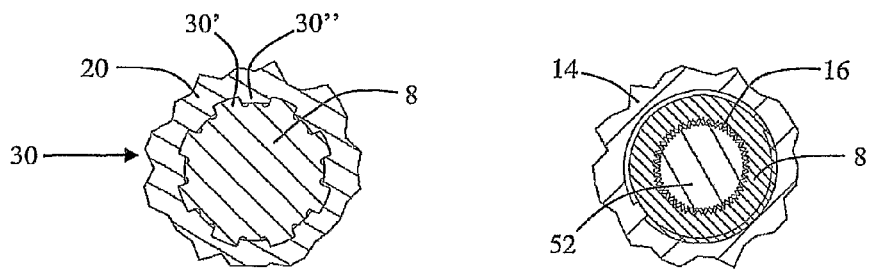
FIGS. 3 and 4 show cross-sections through the plug according to FIG. 2 taken along section lines and IV-IV, respectively, of FIG. 2.

The distinctive characteristic of the plug 2 is that the shaft 8 and the first compression ring 20 are disposed in direct contact with each other by virtue of the shaft 8 and the first compression ring 20 being connected in a non-rotational manner via a suitable spline connection 30, which consists of complementary connection elements 30', 30" (cf. FIG. 3). In this manner, the first compression ring 20 is prevented from rotating when the force transmission sleeve 14 is rotated relative to the shaft 8 via said thread connection 16. Thereby, an optimum transmission and control of an activation force for the plug 2 is also ensured. This relates is both to setting and disengagement of the plug 2.

A guide ring 32 is also incorporated in the two-part sealing body 28 and in contact with the stop plate 18. The purpose of the guide ring 32, which is harder than the elastomer material in the sealing body 28, is to guide the deformation of the sealing body 28 during compression of the plug 2.

Said conical support body 22 also has a hard and polished surface provided with a suitable lubricant for reducing the friction and hence promote the sliding of said gripping dogs 24 on the outside of the support body 22 during setting and disengagement thereof. Each gripping dog 24 is provided with outwardly-directed teeth 34 for engagement with the enclosing, inner pipe wall of the pipe 4. The gripping dogs 24 are shaped as segments of a circle disposed in peripheral vicinity of each other. Upon activation of the plug 2, the gripping dogs 24 will move both axially and radially on the outside of the conical support body 22, whereby also the gripping dogs 24 will move peripherally relative to each other. The gripping dogs 24, on the outside thereof, are also provided with a peripheral and elastic ring gasket 36 for keeping the gripping dogs 24 in place relative to each other during their movement on the outside of the conical support body 22. Upon disengaging the plug 2 from the pipe 4, the elastically compressed ring gasket 36 will expand and thus contribute to push the gripping dogs 24 away from the pipe 4 and along the surface of the conical support body 22.

The plug 2 is also provided with an elastic delay ring 38 disposed between said second compression ring 26 and the support body 22, and in contact therewith. The delay ring 38 is formed from a softer and more yielding elastomer material than the elastomer material of the sealing body 28. Moreover, the delay ring 38 has a smaller cross-sectional area than the cross-sectional area of the sealing body 28. Thereby, the delay ring 38 is structured in a manner allowing it to be deformed more in the axial direction than that of the sealing body 28 upon compression thereof, whereby the gripping dogs 24 are forced against the wall of the pipe 4 before the sealing body 28 is forced against the pipe wall. By so doing, the sealing body 28 is protected against any damage during setting of the plug 2.

In order to allow such a plug setting sequence (or a plug disengagement sequence) to be carried out, the second compression ring 26 is formed with an axially extending, outer collar 40 which is in contact with an axially extending push segment 42 on each gripping dog 24. The compression ring 26 is also formed with an axially extending, inner collar 44 which is somewhat longer than the outer collar 40, and which faces towards an end of the support body 22. This is of significance to said plug setting sequence or plug disengagement sequence.

Figure 5:
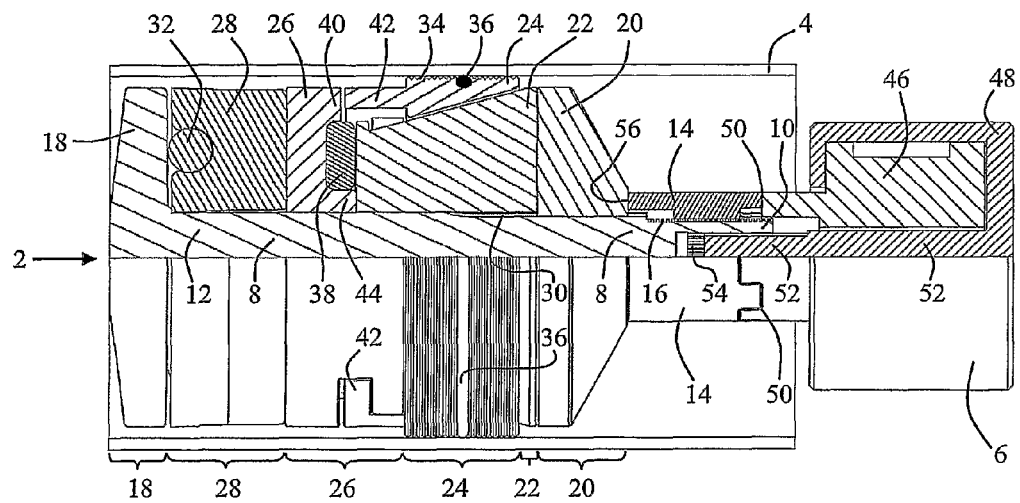
FIG. 5 shows the plug according to FIG. 2, but wherein the wedge-shaped gripping dogs of the plug are shown activated and in engagement with the pipe.
Figure 6:
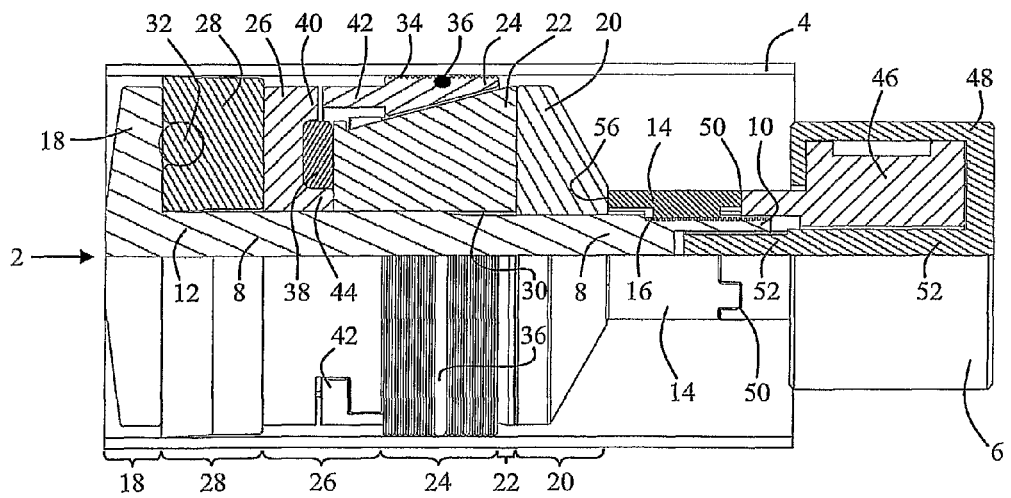
FIG. 6 shows the plug according to FIG. 5, but wherein the sealing ring of the plug also is shown activated and in engagement with the pipe.
Figure 7:
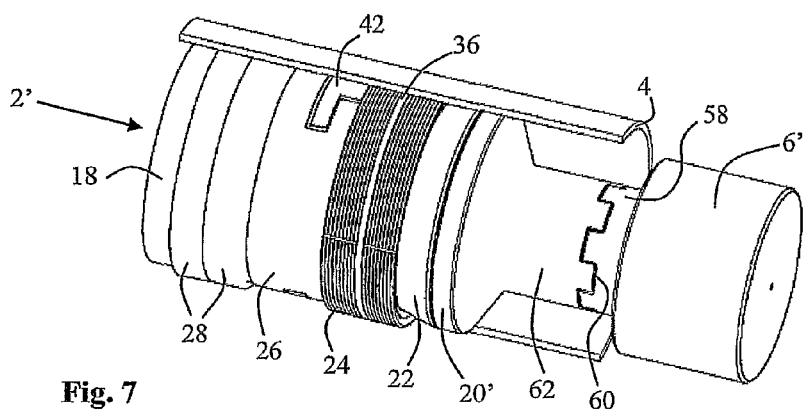
FIG. 7 shows a perspective view of a second embodiment of a plug according to the invention placed in a pipe, wherein the plug also comprises a motor for activation and setting of the plug in the pipe.

When the plug 2 is in an inactive and non-expanded position, the inner collar 44 and the support body 22 are disposed at a distance from each other (cf. FIG. 2). On the other hand, when said force transmission sleeve 14 is rotated about the shaft 8 for activation and setting of the plug, an activation force is immediately transmitted to the elastic delay ring 38 for compression thereof. Simultaneously, the activation force is transmitted to the gripping dogs 24 in order to displace them along the surface of the support body 22. This course of action continues until the gripping dogs 24 are forced in an anchoring manner against the wall of the pipe 4, and until the delay ring 38 is sufficiently compressed to bring said inner collar 44 on the second compression ring 26 in contact with said end of the support body 22, as shown in FIG. 5. Upon subsequent and further rotation of the force transmission sleeve 14, the sealing body 28 is then compressed and expands outwardly for sealing contact with the pipe 4, as shown in FIG. 6. Due to said self-locking thread connection 16 between the force transmission sleeve 14 and the shaft 8, both the sealing body 28 and the gripping dogs 24 will maintain their plug-setting positions upon ceasing the rotation of the force transmission sleeve 14 and the activation force. This operation is considerably different from the operation of the above-mentioned, pressure leakage sensitive, hydraulically/pneumatically activated plugs.

Yet further, FIGS. 7-12 show a second embodiment of a plug 2' according to the invention, whereas FIGS. 13-15 show a third embodiment of a plug 2" according to the invention. Emphasis is made to the fact that the above-mentioned plug construction elements and mode of operation for the plug 2 (cf. the first embodiment) is substantially similar to the plug elements and mode of operation for the plugs 2' and 2" according to the second and third embodiment of the invention. The technical differences existing between these three plug embodiments mainly concern the manner in which said activation force is transmitted to the respective plugs 2, 2' and 2". This will be discussed in the following description.

As mentioned, the plug 2 according to the first embodiment comprises an electric motor 6 (driving device). The motor 6 comprises, among other things, a rotatable inner part 46 and a stationary outer part 48, both of which are shown very schematically in FIGS. 2, 5 and 6. Via an interlocking coupling 50, the rotatable inner part 46 is connected to the force transmission sleeve 14 of the plug 2 for rotation thereof. Further, the stationary outer part 48 comprises an internal connecting shaft 52 of a centric location relative to the motor 6, the shaft 52 of which is carried through the rotatable inner part 46 and is connected to the plug shaft 8 for rotation-preventing fixation thereof. In this embodiment, the connecting shaft 52 and the plug shaft 8 are connected via a spline connection 54 arranged in an axially extending manner inside the plug shaft 8 at the first end 10 thereof (cf. FIGS. 2 and 5). Thus, the stationary outer part 48 and the connecting shaft 52 constitute a foothold for the plug shaft 8, and thereby the present plug construction is structured in a manner allowing it to take a foothold (counteracting support) within itself. Such a construction prevents the plug 2 from rotating about its own longitudinal axis when the plug 2 is activated for setting or disengagement from the pipe 4.

For the setting of the plug 2, the inner part 46 of the motor 6 is rotated and thus transmits an activating torque to the force transmission sleeve 14 via said interlocking coupling 50. By so doing, the force transmission sleeve 14 is also rotated relative to the plug shaft 8 via said thread connection 16. Simultaneously, the plug shaft 8 is held in a fixed position by the stationary outer part 48 and connecting shaft 52 of the motor 6. The rotary movement of the force transmission sleeve 14 about and along the plug shaft 8 thus transmits an activation force to the first compression ring 20 of the plug 2. The activation force is transmitted from an end of the sleeve 14 and onto an impingement surface 56 on the compression ring 20. The impingement surface 56 may be hard and smooth, for example polished, and/or be provided with a suitable lubricant in order to reduce friction and thus promote the sliding between the force transmission sleeve 14 and the first compression ring 20. As an alternative, the impingement surface 56 may be provided with a suitable thrust bearing/axial bearing (not shown). During continuous rotation of the inner part 46 and the force transmission sleeve 14, the first compression ring 20 and the connecting shaft 52 move axially via their respective spline connections 30 and 54, as shown in FIGS. 2, 5 and 6.

A driving device for a plug 2' according to the second embodiment of the invention will now be described (cf. FIGS. 7-12).

The plug 2' comprises, among other things, a driving device in the form of an electric motor 6' and a plug shaft 8'. Contrary to the plug 2 according to the first embodiment, the plug shaft 8' lacks internal splines at the first end 10 thereof.

Figure 11:
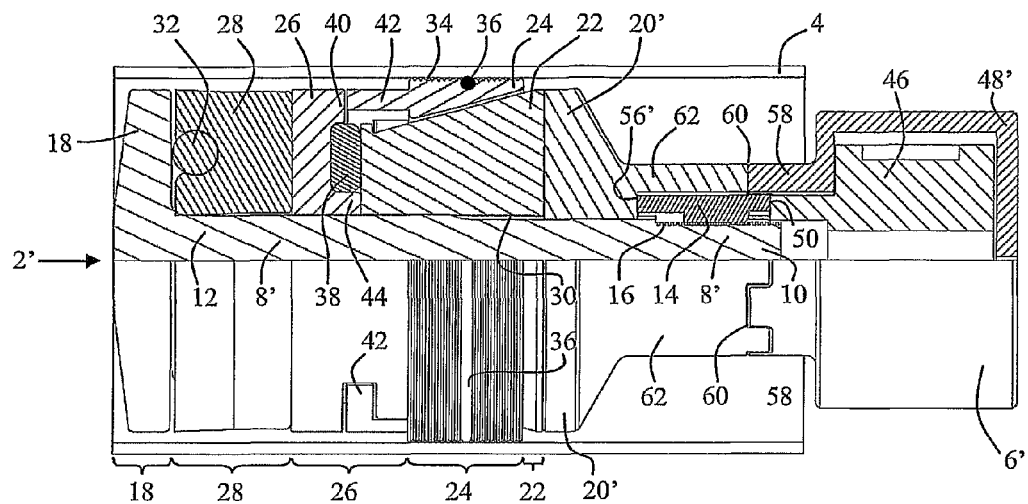
FIG. 11 shows the plug according to FIG. 8, but wherein the wedge-shaped gripping dogs of the plug are shown activated and in engagement with the pipe.
Figure 12:
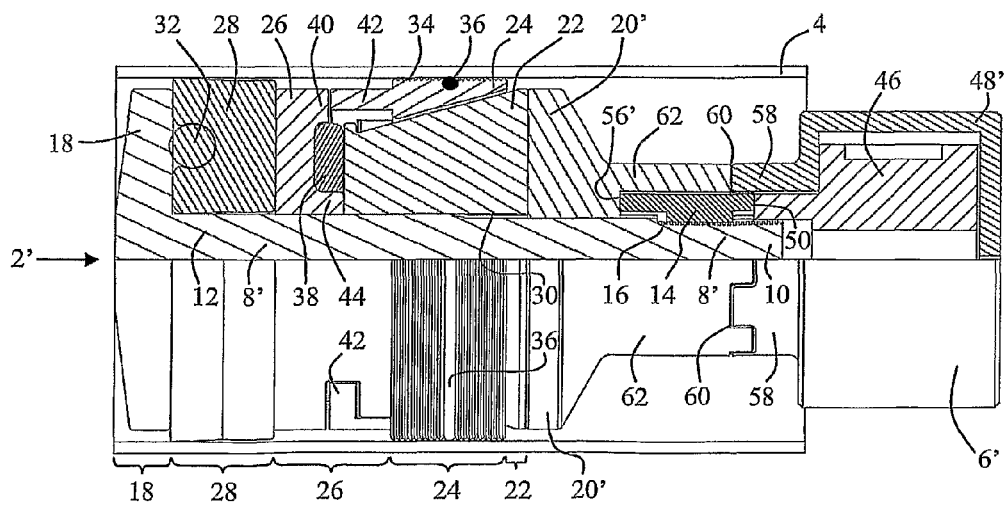
FIG. 12 shows the plug according to FIG. 11, but wherein the sealing ring of the plug also is shown activated and in engagement with the pipe.

Similar to the first embodiment, also this motor 6' comprises, among other things, a rotatable inner part 46 as well as a somewhat differently shaped, stationary outer part 48', both of which are shown very schematically in FIGS. 8, 11 and 12. Also here the rotatable inner part 46 is connected to the force transmission sleeve 14 of the plug 2' via an interlocking coupling 50 for rotation of the sleeve 14. For rotation-preventing fixation of the plug shaft 8', the stationary outer part 48' is formed with (or provided with) an axially extending coupling sleeve 58. Via a further interlocking coupling 60, the coupling sleeve 58 is connected to an axially extending connecting sleeve 62 associated with a somewhat differently shaped, first compression ring 20'. In this embodiment, the connecting sleeve 62 is formed as an extension of the compression ring 20'. Both the coupling sleeve 58 and the connecting sleeve 62 are disposed about the force transmission sleeve 14. Also here the stationary outer part 48' of the motor 6' constitutes a foothold for the plug shaft 8', however noticeably via the coupling sleeve 58, the interlocking coupling 60, the connecting sleeve 62, the compression ring 20' and the spline connection 30. Thereby, also this plug construction is structured in a manner allowing it to take a foothold (counteracting support) within itself, whereby the plug 2' is prevented from rotating about its own longitudinal axis when it is activated for the setting or disengagement from the pipe 4.

Also here the plug 2' is set by rotating the inner part 46 of the motor 6' in order to transmit, in this manner, a torque to the force transmission sleeve 14 via said interlocking coupling 50. By so doing, the force transmission sleeve 14 is also rotated relative to the plug shaft 8' via said thread connection 16, whereas the plug shaft 8' is held in a fixed position, in the manner mentioned above, by the stationary outer part 48' of the motor 6'. By rotating the force transmission sleeve 14 about and along the plug shaft 8', an activation force is transmitted to the first compression ring 20' of the plug 2'. The activation force is transmitted from an end of the sleeve 14 and onto an impingement surface 56' towards the compression ring 20' and on the inside of the connecting sleeve 62. Also here the impingement surface 56' may be hard and smooth, for example polished, and/or be provided with a suitable lubricant in order to promote the sliding between the force transmission sleeve 14 and the first compression ring 20'. Alternatively, the impingement surface 56 may be provided with a suitable thrust bearing/axial bearing (not shown). During continuous rotation of the inner part 46 and the force transmission sleeve 14, the first compression ring 20' moves axially via said spline connections 30, as shown in FIGS. 8, 11 and 12.

A plug 2" according to the third embodiment of the invention is will now be described (cf. FIGS. 13-15), the plug 2" being substantially identical to the preceding plug 2' according to the second embodiment.

Also in this embodiment, the plug 2" comprises, among other things, a driving device in the form of an electric motor 6" with a rotatable inner part 46 and a stationary outer part 48", and also a plug shaft 8". Contrary to the plug 2' according to the second embodiment, the plug shaft 8" is provided with a throughgoing and flow-through opening 64. The stationary outer part 48" is also provided with an opening 66. Thereby, the plug 2" allows flow throughput after being set in the pipe 4, whereby the plug 2" possibly may be used as a diminishing pipe ("reducer") in order to reduce the cross-sectional area of flow of the pipe 4 in the plug section. This is described in further detail above. The cross-sectional area of flow through the plug 2" may be adapted to the specific requirement simply by selecting a suitable diameter for the plug shaft 8" and its opening 64, and for the opening 66 in the stationary outer part 48" of the motor 6".

The invention claimed is:

1. A plug (2, 2', 2") for setting in a pipe (4), the plug (2, 2', 2") comprising:
    a shaft (8, 8', 8") having a first end (10) and a second end (12);
    a force transmission body (14) disposed about the shaft (8, 8', 8") at the first end (10) thereof, wherein the force transmission body (14) is connected in a rotatable and axially movable manner to the shaft (8, 8', 8") via a thread connection (16);
    a stop body (18) disposed at the second end (12) of the shaft (8, 8', 8"); and
    plug construction elements disposed between the force transmission body (14) and the stop body (18) including:
        a first compression body (20, 20') disposed in an axially movable manner about the shaft (8, 8', 8") and in proximity of the force transmission body (14);
        a support body (22) with a conical surface disposed in an axially movable manner about the shaft (8, 8', 8");
        at least one anchoring body (24) structured axially movable, hence radially movable, on the outside of the conical support body (22);
        a second compression body (26) disposed in an axially movable manner about the shaft (8, 8', 8"); and
        at least one elastic sealing body (28) disposed about the shaft (8, 8', 8"), wherein the shaft (8, 8', 8") and the first compression body (20, 20') are disposed in direct contact with each other;
    the shaft (8, 8', 8") and the first compression body (20, 20') are connected in a non-rotational manner via complementary connection elements (30', 30");
    the first compression body (20, 20') is prevented from rotating when the force transmission body (14) is rotated, thereby ensuring an optimum transmission and control of an activation force for the plug (2, 2', 2").

2. The plug (2, 2', 2") according to claim 1, wherein the connection between the shaft (8, 8', 8") and the first compression body (20, 20') is comprised of a tongue and groove type of connection (30).

3. The plug (2, 2', 2") according to claim 2, wherein the connection is comprised of a spline connection (30).

4. The plug (2, 2', 2") according to claim 1, wherein the shaft (8, 8', 8") has a non-circular cross-sectional shape, whereas the first compression body (20, 20') comprises an axial opening having a complementary, non-circular cross-sectional shape relative to that of the shaft (8, 8', 8").

5. The plug (2, 2', 2") according to claim 1 further including the second compression body (26) being disposed in proximity of the support body (22);
    an elastic delay body (38) being disposed between the second compression body (26) and the support body (22); and
    the delay body (38) being structured in a manner allowing it to be deformed more in the axial direction than that of the sealing body (28) upon compression thereof, whereby said anchoring body (24) is set before the sealing body (28) is set.

6. The plug (2, 2', 2") according to claim 5, wherein the elastic delay body (38) is formed from a softer and more yielding material than the material of the sealing body (28).

7. The plug (2, 2', 2") according to claim 5, wherein the elastic delay body (38) is arranged with a smaller cross-sectional area than the cross-sectional area of the sealing body (28).

8. The plug (2, 2', 2") according to claim 5, wherein the elastic delay body (38) is comprised of at least one spring.

9. The plug (2, 2', 2") according to claim 1 wherein the plug (2, 2', 2") also comprises a driving device (6, 6', 6") structured for rotation of the force transmission body (14) and simultaneous, rotation-preventing fixation of the shaft (8, 8', 8").

10. The plug (2) according to claim 9, wherein the driving device (6) comprises a rotatable inner part (46) and a stationary outer part (48);
    the rotatable inner part (46) is connected to the force transmission body (14) for rotation thereof; and
    the stationary outer part (48) also comprises an internal connection body (52) connected to the shaft (8) for rotation-preventing fixation thereof.

11. The plug (2', 2") according to claim 9, wherein the driving device (6', 6") comprises a rotatable inner part (46) and a stationary outer part (48', 48");
    the rotatable inner part (46) is connected to the force transmission body (14) for rotation thereof; and the stationary outer part (48', 48"), for rotation-preventing fixation of the shaft (8', 8"), is connected to the first compression body (20') via an external connection body (62) disposed about the force transmission body (14).

12. The plug (2, 2', 2") according to claim 9, wherein the driving device is selected from the group consisting of: an electric motor (6, 6', 6"), a hydraulic motor and a pneumatic motor.

13. The plug (2") according to claim 1 wherein the shaft (8") is provided with a throughgoing and flow-through opening (64).

14. A method of setting a plug in a pipe (4), characterized in that the method comprises the following steps:

using a plug (2, 2', 2") having a shaft having a first end and a second end; a force transmission body disposed about the shaft at the first end thereof and connected in a rotatable and axially movable manner to the shaft via a thread connection; a stop body disposed at the second end of the shaft; plug construction elements being disposed between the force transmission body and the stop body and including a first compression body disposed in an axially movable manner about the shaft and in proximity of the force transmission body; a support body with a conical surface disposed in an axially movable manner about the shaft; at least one anchoring body structured axially movable, hence radially movable, on the outside of the conical support body; a second compression body disposed in an axially movable manner about the shaft; and at least one elastic sealing body disposed about the shaft, wherein the shaft and the first compression body are disposed in direct contact with each other; the shaft and the first compression body being connected in a non-rotational manner via complementary connection elements; and the first compression body being prevented from rotating when the force transmission body is rotated, thereby ensuring an optimum transmission and control of an activation force for the plug, inserting the plug (2, 2', 2") to a setting point in the pipe (4); and rotating the force transmission body (14) relative to the shaft (8, 8', 8") until said anchoring body (24) and sealing body (28) have been set against the wall of the pipe (4).

15. The method according to claim 14, in order to pressure test the pipe (4), further comprises a step of pressure-isolating the pipe (4) at a point located at a distance from the setting point of the plug (2, 2', 2"), whereby a pipe section located between said two points is prepared for pressure testing.

16. The method according to claim 15, further comprises the following steps:

using a plug (2") having a shaft (8") provided with a throughgoing and flow-through opening (64); and directing a pressure testing medium via the opening (64) in the shaft (8") in order to pressure test said pipe section.

17. The method according to claim 14, in order to establish a pressure barrier in the pipe (4), further comprises a step of inserting the plug (2, 2') to a setting point in the pipe (4).

18. The method according to claim 14, in order to anchor equipment in the pipe (4), further comprises the following steps:

connecting the equipment to the plug (2, 2', 2"); and inserting the plug (2, 2', 2") to a setting point in the pipe (4).

19. The method according to claim 18, using a plug (2") having a shaft (8") provided with a throughgoing and flow-through opening (64).

20. The method according to claim 14, in order to reduce the cross-sectional area of flow of the pipe (4), further comprises the following steps:

using a plug (2") having a shaft (8") provided with a throughgoing and flow-through opening (64); and inserting the plug (2") to a setting point in the pipe (4).

* * * * *